US011187541B2

(12) United States Patent
Gibran et al.

(10) Patent No.: US 11,187,541 B2
(45) Date of Patent: Nov. 30, 2021

(54) PREDICTIVE DOWNLOADING OF MAP DATA

(75) Inventors: Christophe Gibran, Kanata (CA); Robert Watt, Kanata (CA); Michael J. Crowley, Irving, TX (US)

(73) Assignee: BlackBerry Limited, Waterloo (CA)

( * ) Notice: Subject to any disclaimer, the term of this patent is extended or adjusted under 35 U.S.C. 154(b) by 1260 days.

(21) Appl. No.: 12/354,213

(22) Filed: Jan. 15, 2009

(65) Prior Publication Data

US 2009/0281718 A1 Nov. 12, 2009

Related U.S. Application Data

(60) Provisional application No. 61/051,754, filed on May 9, 2008.

(51) Int. Cl.
*G01C 21/32* (2006.01)

(52) U.S. Cl.
CPC .................................. *G01C 21/32* (2013.01)

(58) Field of Classification Search
CPC ... H04W 4/00; H04W 72/1215; H04W 16/14; H04W 36/20; H04W 52/146; H04W 52/40; H04W 72/1226; H04W 48/18; G06F 17/30241; G01C 21/32; G01C 21/3682; G01C 21/26; G01C 21/20; G01C 21/365; G01C 21/367; G01C 21/34; G01C 21/3667; G01C 21/3679; G01C 21/165; G01C 21/36; G01C 21/12; H04L 67/12
USPC ............ 340/990, 975; 342/90; 701/209–213, 701/454, 514, 408, 208, 455, 532, 461, 701/456; 370/320, 328; 455/456
See application file for complete search history.

(56) References Cited

U.S. PATENT DOCUMENTS 5,430,657 A * 7/1995 Kyrtsos ..................... 701/469
5,699,255 A 12/1997 Ellis et al.
(Continued)

FOREIGN PATENT DOCUMENTS

EP 1251335 A3 10/2002
EP 1 498 696 A1 1/2005
(Continued)

OTHER PUBLICATIONS

Benjamin T. Weber, Mobile Map Browsers: Anticipated User Interaction for Data Pre-fetching, The University of Maine DigitalCommons@UMaine, Electronic Theses and Dissertations, Fogler Library, pp. 29-30 (Year: 2010).*

(Continued)

*Primary Examiner* — Jonathan Ng
*Assistant Examiner* — Teresa S Williams
(74) *Attorney, Agent, or Firm* — Conley Rose, P. C.; J. Robert Brown, Jr.

(57) ABSTRACT

A method of requesting map data by a wireless communications device entails steps of predicting a future area of interest for which map data may be required, downloading the map data for the future area of interest, and then caching the map data for the future area of interest. Cached map data is thus available for rendering when the device moves into the future area of interest, thus expediting the generation of onscreen maps. Predicting the future area of interest can be accomplished, for example, by determining the direction of travel, by identifying a roadway upon which the device user is travelling, or by identifying a programmed route in a navigation application.

15 Claims, 14 Drawing Sheets

(56) References Cited

U.S. PATENT DOCUMENTS

| | | | |
|---|---|---|---|
| 5,745,866 A * | 4/1998 | Steiner | G01C 21/367 |
| | | | 340/990 |
| 5,802,492 A | 9/1998 | DeLorme et al. | |
| 5,890,070 A * | 3/1999 | Hamada | 455/524 |
| 6,278,938 B1 | 8/2001 | Alumbaugh | |
| 6,321,158 B1 | 11/2001 | DeLorme et al. | |
| 6,362,817 B1 * | 3/2002 | Powers et al. | 345/419 |
| 6,456,938 B1 * | 9/2002 | Barnard | 701/213 |
| 6,662,102 B2 | 12/2003 | Katayama et al. | |
| 6,735,524 B1 * | 5/2004 | Challoner et al. | 701/500 |
| 6,744,745 B1 * | 6/2004 | Fukui | 370/320 |
| 6,744,746 B1 * | 6/2004 | Bartelme | 370/329 |
| 6,771,189 B2 * | 8/2004 | Yokota | G01C 21/3632 |
| | | | 340/990 |
| 6,853,911 B1 * | 2/2005 | Sakarya | 701/208 |
| 7,203,597 B2 | 4/2007 | Sato et al. | |
| 7,236,882 B2 * | 6/2007 | Karaoguz | G01C 21/34 |
| | | | 342/357.22 |
| 7,315,259 B2 * | 1/2008 | Sacks | G06F 3/147 |
| | | | 340/995.1 |
| 7,327,349 B2 * | 2/2008 | Robbins et al. | 345/156 |
| 7,365,678 B2 * | 4/2008 | Heine et al. | 342/357.31 |
| 7,538,715 B2 * | 5/2009 | Langford | G01S 5/0252 |
| | | | 342/90 |
| 7,751,971 B2 * | 7/2010 | Chang et al. | 701/426 |
| 7,788,077 B2 * | 8/2010 | Meng | 703/13 |
| 7,890,259 B2 * | 2/2011 | Kamdar et al. | 701/213 |
| 8,108,145 B2 * | 1/2012 | Karaoguz | G01C 21/34 |
| | | | 340/995.12 |
| 8,554,478 B2 * | 10/2013 | Hartman | G01S 17/023 |
| | | | 180/167 |
| 2002/0067379 A1 * | 6/2002 | Kenyon | G06F 17/30241 |
| | | | 715/838 |
| 2002/0082771 A1 * | 6/2002 | Anderson | 701/209 |
| 2002/0193121 A1 * | 12/2002 | Nowak et al. | 455/456 |
| 2003/0060973 A1 | 3/2003 | Mathews et al. | |
| 2003/0135327 A1 * | 7/2003 | Levine et al. | 701/220 |
| 2004/0249534 A1 * | 12/2004 | Yamada et al. | 701/36 |
| 2005/0024201 A1 * | 2/2005 | Culpepper et al. | 340/539.13 |
| 2005/0125148 A1 | 6/2005 | Van Buer et al. | |
| 2006/0080032 A1 * | 4/2006 | Cooper | G01C 21/32 |
| | | | 701/532 |
| 2006/0200302 A1 | 9/2006 | Seko | |
| 2007/0213074 A1 * | 9/2007 | Fitch et al. | 455/456.2 |
| 2007/0219708 A1 * | 9/2007 | Brasche | G08G 1/0962 |
| | | | 701/457 |
| 2007/0219720 A1 * | 9/2007 | Trepagnier et al. | 701/300 |
| 2008/0070588 A1 * | 3/2008 | Morin | 455/456.1 |
| 2008/0133124 A1 * | 6/2008 | Sarkeshik | 701/201 |
| 2008/0174452 A1 * | 7/2008 | Yamamoto et al. | 340/932.2 |
| 2008/0174454 A1 | 7/2008 | Bitar et al. | |
| 2008/0208455 A1 * | 8/2008 | Hartman | G01S 17/023 |
| | | | 701/408 |
| 2009/0043499 A1 * | 2/2009 | Endo | G01C 21/3492 |
| | | | 701/414 |
| 2009/0182500 A1 * | 7/2009 | Dicke | G01C 21/00 |
| | | | 701/532 |
| 2009/0281722 A1 * | 11/2009 | Bitonti et al. | 701/207 |
| 2010/0060511 A1 * | 3/2010 | Nouvel et al. | 342/29 |

FOREIGN PATENT DOCUMENTS

| | | |
|---|---|---|
| EP | 1530025 A3 | 5/2005 |
| EP | 1548682 A2 | 6/2005 |
| EP | 1549096 B1 | 4/2007 |
| EP | 1909066 A1 | 4/2008 |
| JP | 2003-344070 A | 12/2003 |
| WO | WO2006116240 * | 2/2006 |

OTHER PUBLICATIONS

Examination report dated Oct. 12, 2012, in corresponding European patent application No. 11183841.3.

* cited by examiner

Preload C,B,D,A,E

PREDICTIVE DOWNLOADING OF MAP DATA

CROSS-REFERENCE TO RELATED APPLICATIONS

This application claims priority under 35 U.S.C § 119(e) from U.S. Provisional Patent Application 61/051,754 entitled PREDICTIVE DOWNLOADING OF MAP DATA filed on May 9, 2008.

TECHNICAL FIELD

The present disclosure relates generally to wireless communications devices and, in particular, to techniques for downloading and displaying maps on wireless communications devices.

BACKGROUND

Wireless communications devices such as the BlackBerry® by Research in Motion Limited provide a variety of useful functions, such as voice communication, e-mail and Web browsing. Of growing popularity are mapping applications that take advantage of the device's wireless link and Web capabilities to download and render maps on the device. When coupled to a Global Positioning System (GPS) receiver, either embedded as a GPS chipset or externally (e.g. Bluetooth™ connected), these mapping applications can be used for navigation and other location-based services (LBS). The ability of the wireless device to efficiently download map data from a map server is constrained by the limited bandwidth of the wireless link. Similarly, the ability of the wireless device to process the downloaded map data and to quickly render a map onscreen is constrained by the limited onboard processing capability of the wireless communications device, especially where the processor has to implement a computationally intensive algorithm such as, for example, a labelling algorithm. Over-the-air bandwidth and processor speed thus together play a significant role in determining the overall map-generating performance of the device.

When the user is essentially static, i.e. in a generally fixed location, the lag between the request for map data and the rendering onscreen of a completely detailed map, while noticeable, is usually not terribly inconvenient. At most, the user must wait a few seconds until all the details of the map are rendered onscreen. Areas for which map data is unavailable may be shown as blank, shaded or hatched, for example.

However, when the user is moving quickly, such as, for example, when riding in a car, the lag in generating a detailed map onscreen may be problematic, particularly where the user of the device is relying on the maps for navigation. A lack of real-time map detail may cause the user to miss a turn or get lost, and at the very least diminishes the overall user experience. A technical solution that would enable a detailed map to be rendered onscreen more efficiently would be highly desirable, particularly for navigational purposes.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a novel method, computer readable medium, and wireless communications device that implement predictive downloading of map data to obtain map data for a future area of interest before the device physically moves into that future area of interest. In order to predict what map data to download, the wireless device intelligently assesses its direction of travel, or its current route, or other usage or movement patterns to anticipate where the device is headed and consequently which sets of map data will probably be required. By predicting which sets of map data are required, the map data can be downloaded in advance and cached on the device, thus enabling the device to quickly access the cached data and render a map of the future area of interest much more quickly than is conventionally possible.

Thus, an aspect of the present technology is a method of requesting map data by a wireless communications device. The method comprises steps of predicting a future area of interest for which map data may be required and downloading the map data for the future area of interest. The method may then involve caching the map data for the future area of interest.

Another aspect of the present technology is a computer readable medium comprising code adapted to perform the steps of the foregoing method when the computer readable medium is loaded into memory and executed on a processor of a wireless communications device.

Yet another aspect of the present technology is a wireless communications device having a radiofrequency transceiver for requesting and receiving map data corresponding to an area of interest, a display for displaying an onscreen map of the area of interest based on the map data that has been received using the radiofrequency transmitter, and a processor operatively coupled to memory for predicting a future area of interest for which further map data may be required and for causing the radiofrequency transmitter to download the further map data for the future area of interest. The device may then cause the further map data to be cached in the memory of the wireless communications device.

The details and particulars of these aspects of the technology will now be described below, by way of example, with reference to the attached drawings.

Figure 1:
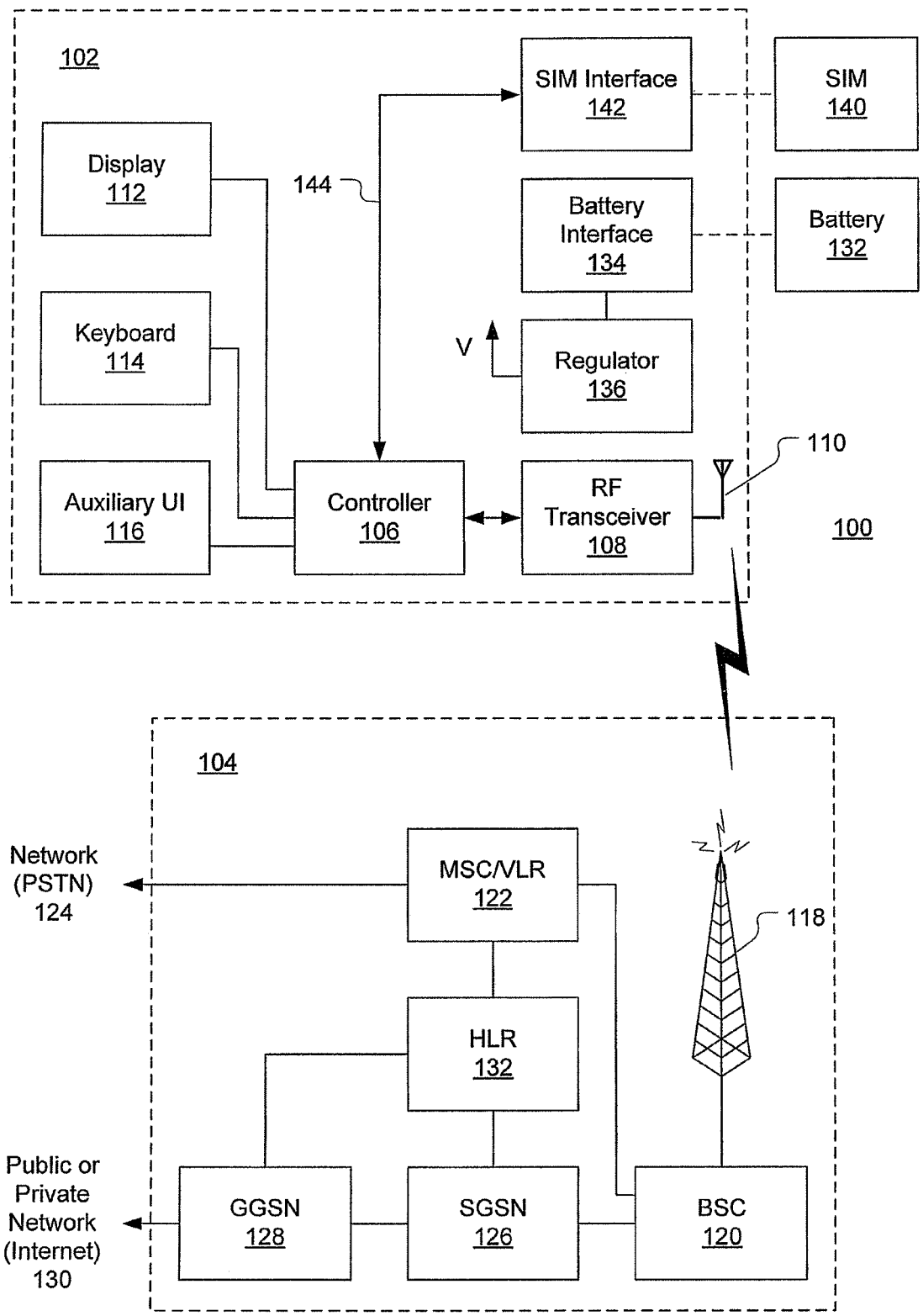
FIG. 1 is a block diagram schematically illustrating pertinent components of an exemplary wireless communications device and of an exemplary wireless communications network on which the present technology can be implemented.

FIG. 1 is a block diagram of an example of a communication system 100 on which the present technology can be implemented. This communication system 100 includes a wireless communications device 102 (also referred to as a mobile communications device or wireless handheld) which communicates through a wireless communications network 104. For the purposes of the present specification, the expression "wireless communications device" encompasses not only a wireless handheld, cell phone or wireless-enabled laptop but also any mobile communications device or portable communications device such as a satellite phone, wireless-enabled PDA, wireless-enabled MP3 player, or wireless-enabled portable GPS navigation unit. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. a liquid crystal display (LCD) screen, a keyboard 114 (or keypad), and optionally one or more auxiliary user interfaces (UI's) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from wireless network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is coupled to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 may optionally operate using a Subscriber Identity Module (SIM) 140 (for GSM-type devices, although the device could also operate on a CDMA network or other type of network). SIM card 140 is connected to or inserted in the wireless communications device 102 at a SIM interface 142. SIM card 140 is used to identify an end user (or subscriber) operating the wireless device 102 and to personalize the device, among other things. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit or other positioning subsystem, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunneling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
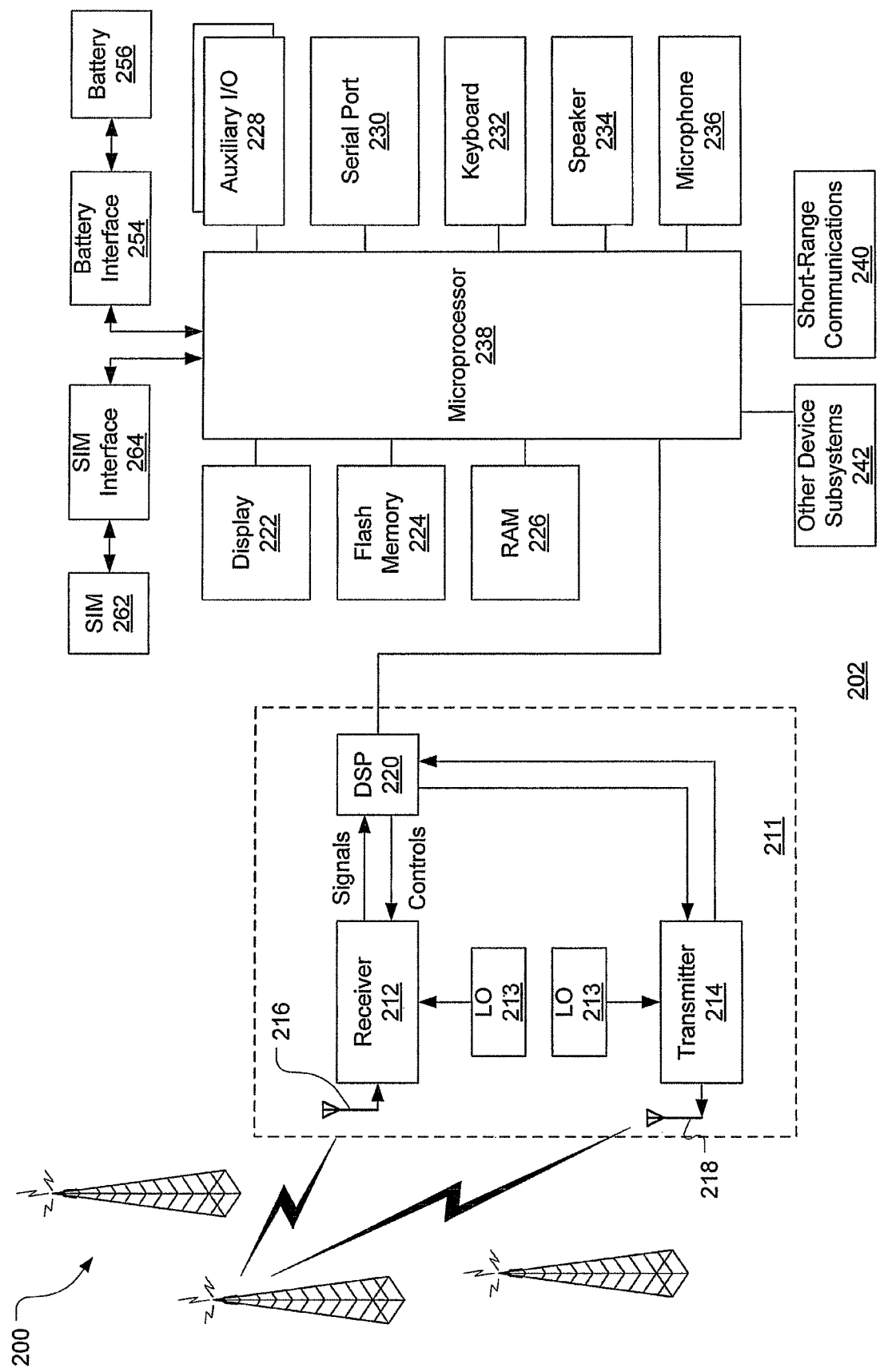
FIG. 2 is a more detailed block diagram of a wireless communications device presented solely as an example of one device on which the present technology can be implemented.

FIG. 2 is a detailed block diagram of an exemplary wireless communications device 202 on which the present technology can be implemented. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-board functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
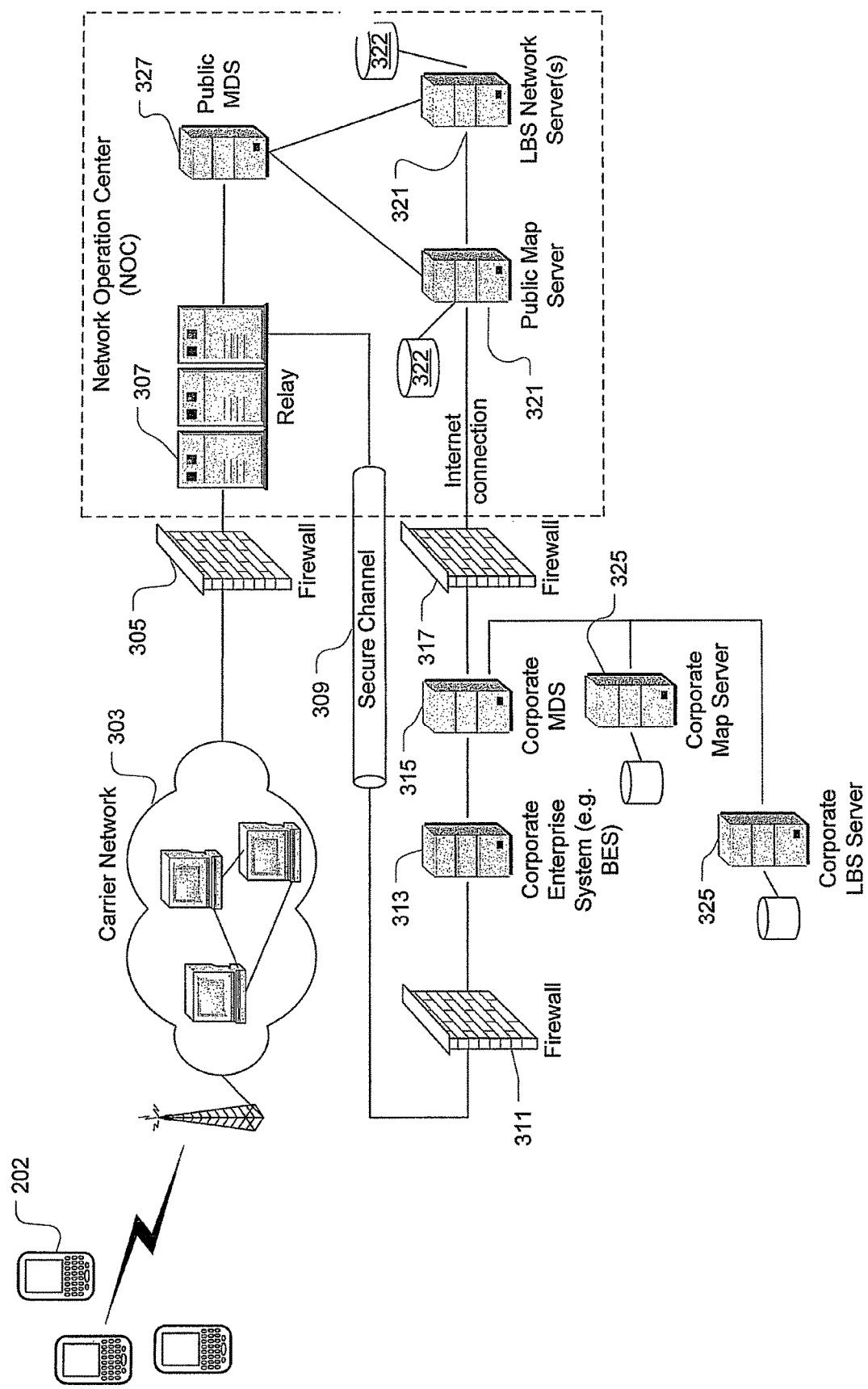
FIG. 3A is a system diagram of exemplary network components which provide mapping functionality in the wireless communications devices of FIG. 1 and FIG. 2.

FIG. 3A is a system diagram of exemplary network components which provide a preferred type of mapping functionality in the wireless communication devices of FIGS. 1 and 2. To achieve this mapping functionality, a mapping application is provided in memory of the wireless communications device for rendering visual maps on its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure can be provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the various points within the DEntry are separated into different parts representing various portions of the artefact or map feature (e.g. portions of the street) A wireless device may issue a request for the map server to download only those DEntries that are included within a specified area or bounding box representing an area of interest that can be represented by, for example, a pair of bottom left, top right coordinates. The present technology can be implemented using other data structures as well, although the use of a map data structure having an index is particularly efficient because, as will be elaborated below, the map index can be used to determine the size of label data for a given area of interest.

Figure 3B:
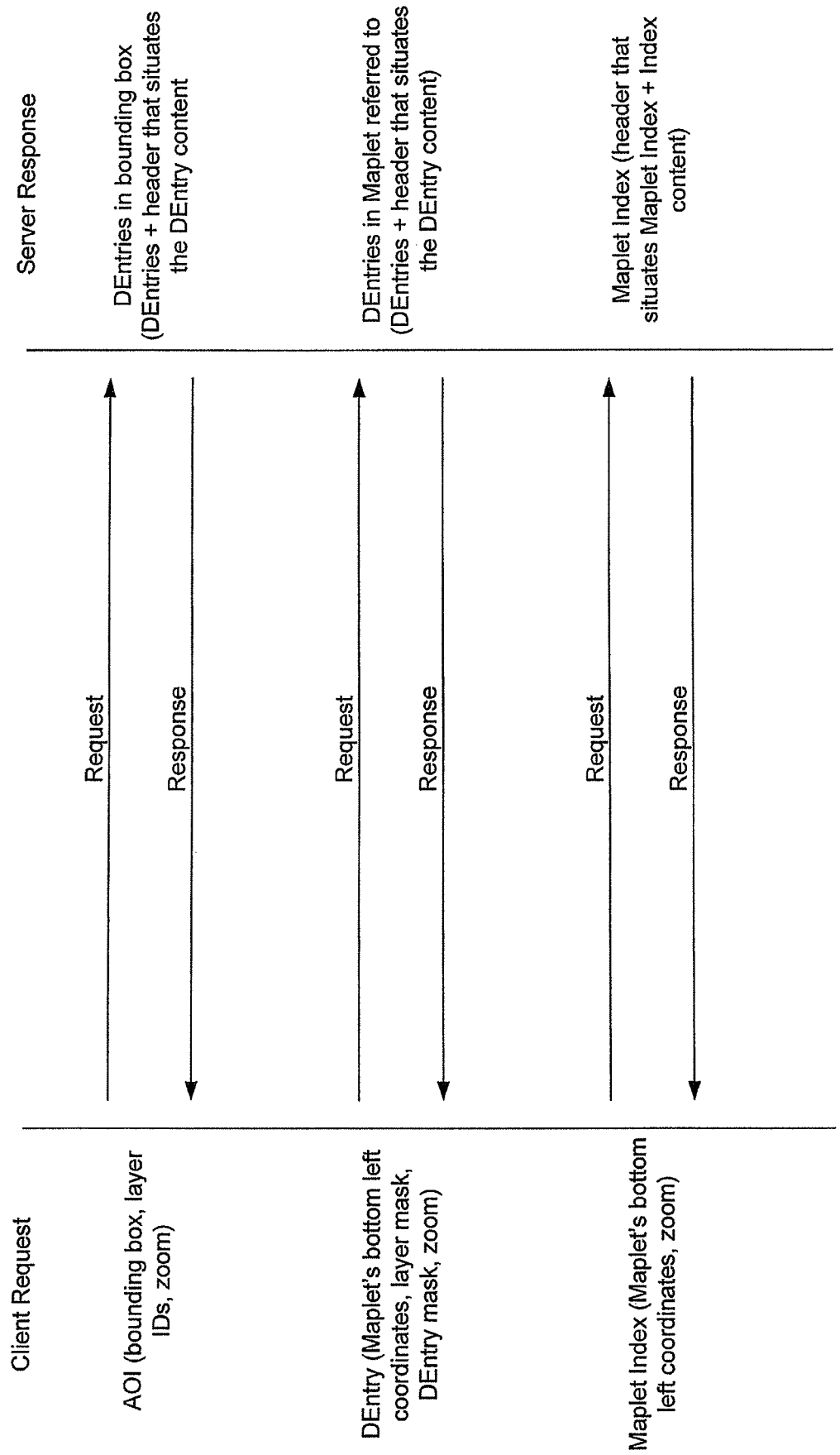
FIG. 3B illustrates an example message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS-enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving over-the-air (OTA) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data request, or DEntry request, is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns one or more Maplet Indexes for the AOI that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | | Beginning of Maplet #0 |
| 0xC80 + Size of Maplet #0 | | Beginning of Maplet #1 |
| 0xC80 + Size of Maplet #0 + #1 | | Beginning of Maplet #2 |
| ... | | ... |
| 0xC80 + Σ of Size of Maplets (#0:#398) | | Beginning of Maplet #399 |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | | Beginning of Maplet Index #0 |
| 0xC80 + Size of Maplet Index #0 | | Beginning of Maplet Index #1 |
| 0xC80 + Size of | | Beginning of Maplet Index #2 |

TABLE C-continued

| Address Offset | Offset (4 bytes) | Length (4 bytes) |
|---|---|---|
| Maplet Index #0 + #1 | | |
| ... | | ... |
| 0xC80 + Σ of Size of Maplet Indices (#0:#399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
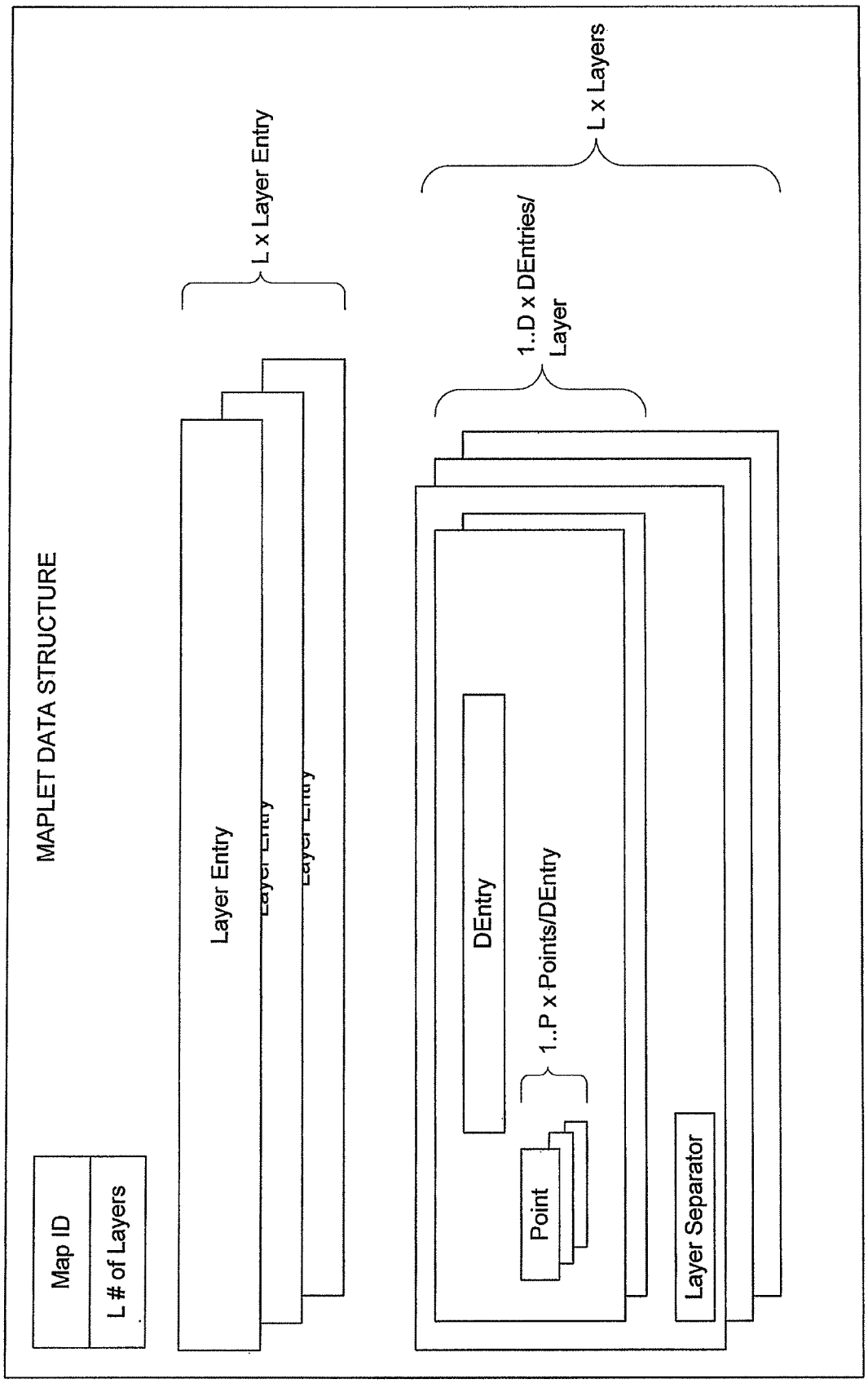
FIG. 3C is a diagram showing a preferred Maplet data structure as one example of a data structure that can be used for the present technology.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. Another optional field (not shown) can be used to explicitly specify the number of DEntries in each layer thereby providing a count of DEntries per layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable. This Maplet index provides a convenient and expedient way of determining the number, content and size of DEntries (both artefacts and labels) in the corresponding Maplet. For any given AOI, more than one Maplet index may be used to determine which labels are available for that AOI (because the AOI may span more than one Maplet).

Table D provides a high "byte-level" description of a Maplet for this example.

TABLE D

| Data | | Quantity | Total # of Bytes |
|---|---|---|---|
| Map ID | | 1 | 4 bytes |
| # of Layers | | 1 | 4 bytes |
| Layer Entries | | # of Layers | 20 bytes × (# of Layers) |
| DEntry of a Layer | x (# of DEntries) | # of Layers | 12 bytes × (Σ of the # of DEntries in each |

TABLE D-continued

| Data | Quantity | Total # of Bytes |
|---|---|---|
| Points for DEntry of a Layer | in a Layer) | Layer) + 4 bytes × (Σ of the # of Points in each DEntry in each Layer) + |
| Layer Separator | | 4 bytes × (# of Layers) |

Figure 4:
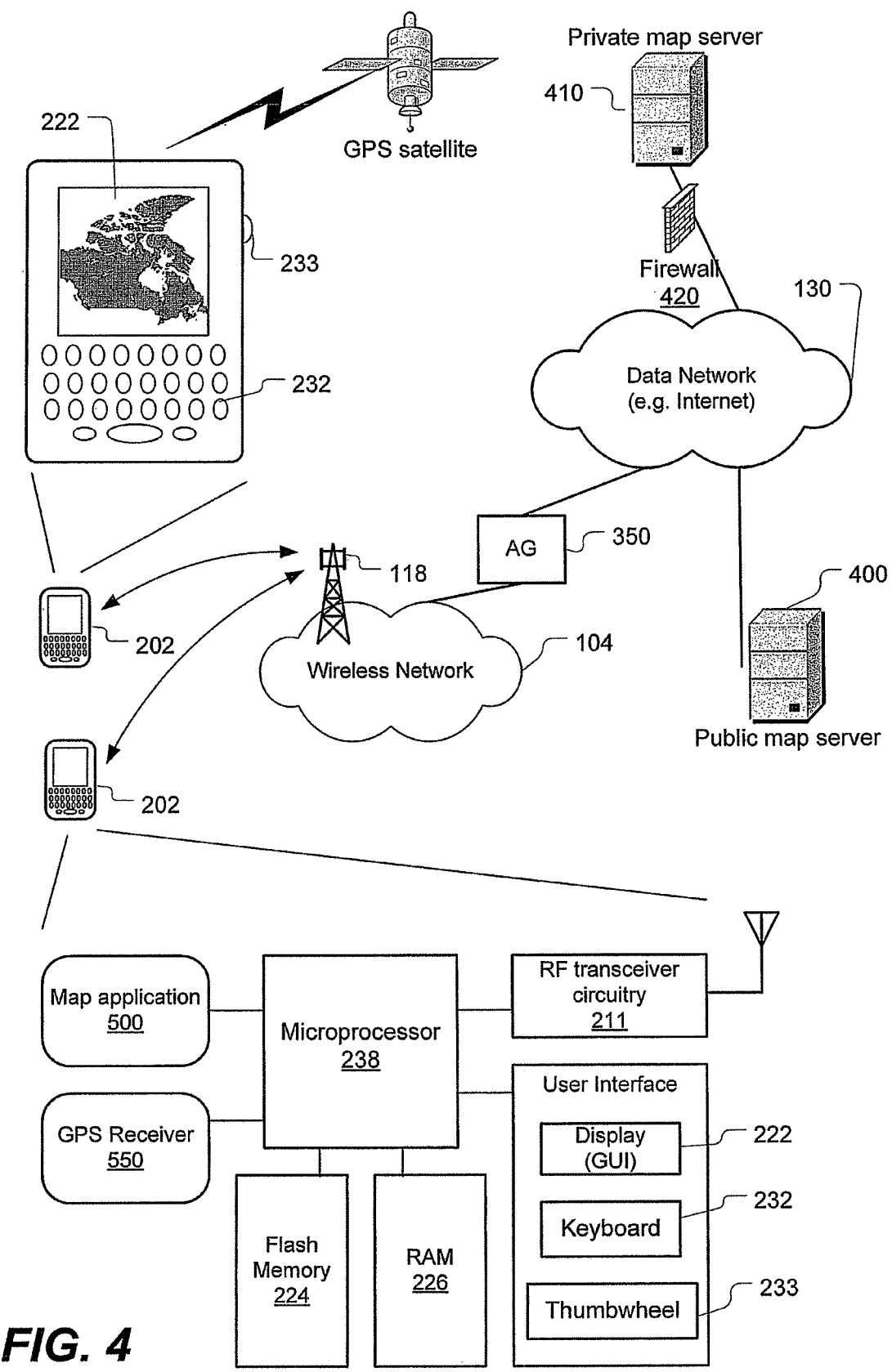
FIG. 4 is a schematic depiction of another example of a wireless network having an applications gateway for optimizing the downloading of map data from map servers to wireless communications devices.

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 104 hosts a plurality of handheld wireless communications devices 202 (such as the BlackBerry® by Research in Motion Limited) having voice and data capabilities (for both e-mail and Web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 104 and the data network by performing various encodings, mappings, compressions and optimizations on the data. The wireless communications device 202 can thus dynamically download label data by using the technology described herein. In accordance with implementations of the presently disclosed technology, the wireless communications device 202 includes a radiofrequency transceiver (e.g. the RF transceiver circuitry 211 shown in FIG. 2) for requesting and receiving map data corresponding to an area of interest, the map data including label data. The wireless communications device 202 also includes a processor (e.g. microprocessor 238 shown in FIG. 2) operatively coupled to memory (e.g. Flash Memory 224 and RAM 226 shown in FIG. 2) for determining a size of label data for the area of interest and for instructing the radiofrequency transceiver 211 to dynamically download label data based on the size of label data for the area of interest. The wireless communications device 202 further includes a display 222 for displaying map labels on a map of the area of interest, wherein the labels are displayed based on the label data that is dynamically downloaded.

The wireless device can optionally include a Global Positioning System (GPS) chipset (e.g. GPS receiver 550 shown in FIG. 4 or other positioning subsystem) for determining a current location of the device 202. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In order to "predictively" download map data in accordance with main implementations of the presently disclosed technology, the wireless communications device need not include a Global Positioning System (GPS) receiver ("GPS chip") 550 but rather could use any other sort of positioning subsystem. Although GPS is the best way presently known for obtaining a current position fix and a bearing reading for a wireless device, a different type of positioning subsystem can be used, e.g. a radiolocation subsystem that determines its current location using radiolocation techniques, as will be elaborated below. In the main implementation, though, the GPS chipset 550 receives and processes signals from GPS satellites to generate latitude and longitude coordinates, thus making the device "location aware". In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

In operation, a user of the wireless communications device 202 uses an input device such as keyboard 232 and/or thumbwheel/trackball 233 (or, still alternatively, a touchscreen or voice-recognition input that is responsive to voice commands) to cause the microprocessor 238 to launch (open) the map (or navigation) application 500 stored in the memory 224. Alternatively, the map (or navigation) application can be launched indirectly by another application, such as a location-based services (LBS) application. Using the keyboard 232 and thumbwheel/trackball 233, the user can specify a map location on the map application 500. In response to this request/command, the microprocessor 238 instructs the RF transceiver circuitry 211 to transmit the request over the air through the wireless network 104. The request is processed by the AG 350 and forwarded into the data network (e.g. Internet) using standard packet-forwarding protocols to one or more of the public and/or private map servers 400, 410. (Accessing a private map server 410 behind a corporate firewall 420 was described above with reference to FIG. 3A.) Map data downloaded from these one or more map servers 400, 410 is then forwarded in data packets through the data network and encoded/transformed/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device. If a further request is made by the user (or if the user wants a change in the field of view by zooming or panning), the device will check whether the required data can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full (or alternatively which specific layers to download). Furthermore, as described earlier, the map application can include user-configurable context filtering that enables the user to filter out unwanted map features or artifacts by not downloading specific DEntries corresponding to those unwanted map features or artifacts. As will be elaborated below, the hierarchical nature of this Maplet data structure facilitates implementation of this technology by allowing the device to efficiently assess the size of label data and then to download specific layers of label data or even specific labels depending on the label data density (size of label data) for a given area of interest (AOI). However, it should be appreciated that the Maplet implementation described above is merely the best mode of implementing the technology and is therefore not the only way of doing so. Map data can be structured in other manners, either with map tiles that have a different grid granularity than the Maplets introduced above or as other map data structures altogether.

Figure 5:
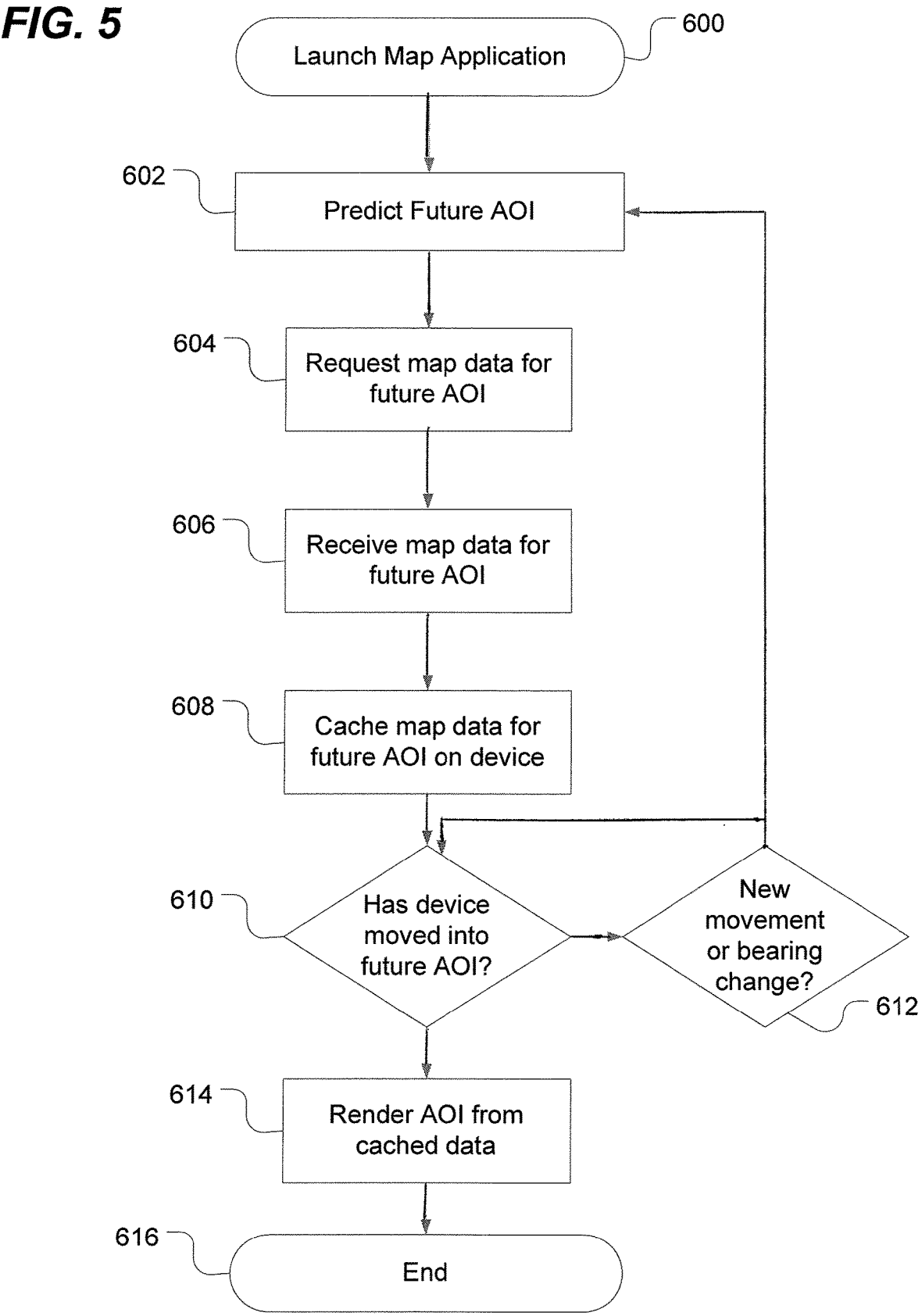
FIG. 5 is a flowchart presenting main steps of a method of downloading map data by predicting a future area of interest in accordance with implementations of the present technology.

Operation of this novel predictive map data download technology introduced above will now be further described with reference to the method steps depicted in the flowchart of FIG. 5. As depicted in FIG. 5, after an initial step 600 of launching the map application (or navigation application) on the device, the device then will request and receive map data for the current AOI. The current AOI can be defined by the user in a number of way, including entering an address, trigger GPS tracking of the current position, program a route, or simply pan or zoom an existing onscreen map. For the purposes of the flowchart of FIG. 5, the downloading and rendering of map data to generate a map of the current AOI is subsumed within step 600. At step 602, the device begins the process of predictively downloading map data. In other words, at step 602, the device predicts a future AOI. Predicting a future AOI can be done by determining the direction of travel of the device, by identifying a route upon which a user of the device is traveling, or by identifying a programmed route that has been specified by the user in a navigation application. Other techniques may also be used to predict a future AOI, such as, for example, recent or historical usage patterns or travel patterns (e.g. routes the user has recently travelled). For example, the device can learn, using artificial intelligence, that the user travels Monday to Friday back and forth from home to work in the morning and the evening. The device will then predict, based on historical travel patterns, each of the areas of interest (each of the map tiles) that will be required along the route from home to the office, even without the user programming this route into the navigation application. As another example, the device's artificial intelligence may learn that every Saturday morning, the user travels with his device to a recreational complex. Again, once the device has learned this travel pattern, the device can automatically predict that it will require map data along this route on Saturday morning at a given time. As yet another example, the device could obtain meeting or event information from a calendar application and then determine the likely route to the event (e.g. using a shortest path algorithm or by using a fastest-path-to-destination algorithm that takes into account path speed limits). Map data for each successive map along the route to the event location can then be predicted (and then downloaded and cached in advance). In another variant, the route may be provided along with an invitation to an event or meeting in which case the device may use the provided routing instructions to preload the map tiles along the route to be taken. Preloading of map data may be done by downloading all the map data for all of the tiles along the route prior to embarking on the trip or it may entail successively downloading, caching and flushing the map tiles as the device progresses along the route.

Regardless how the future AOI is predicted, the device requests map data at step 604 based on the predicted future AOI. At step 606, the device receives the map data for the future AOI. At step 608, the map data is cached in memory on the device. At step 610, the device decides whether it has moved into the future AOI. If the device has not moved into the future AOI then, at step 612, the device decides whether there has been any movement or any bearing change that would require re-evaluation of the predicted AOI. If yes, then operations cycle back to step 602 where the device predicts a new future AOI. It should be noted that more than one AOI may be predicted. For example, if the device is moving erratically, i.e. in an inconsistent direction, then the device may predict that two or more AOI's may shortly become relevant. In that case, the device may pre-emptively download and cache map data for two or more AOI's.

Once the device has moved into the future AOI, the device pulls the map data for that AOI from the local cache and renders the map onscreen (step 614). Thereafter, operations end temporarily (step 616). Optionally, the device can then predict a new future AOI. Further predictions can be made based on movement, as per above, or can be timed to occur periodically such as, for example, based on average velocity of the device.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Figure 6:
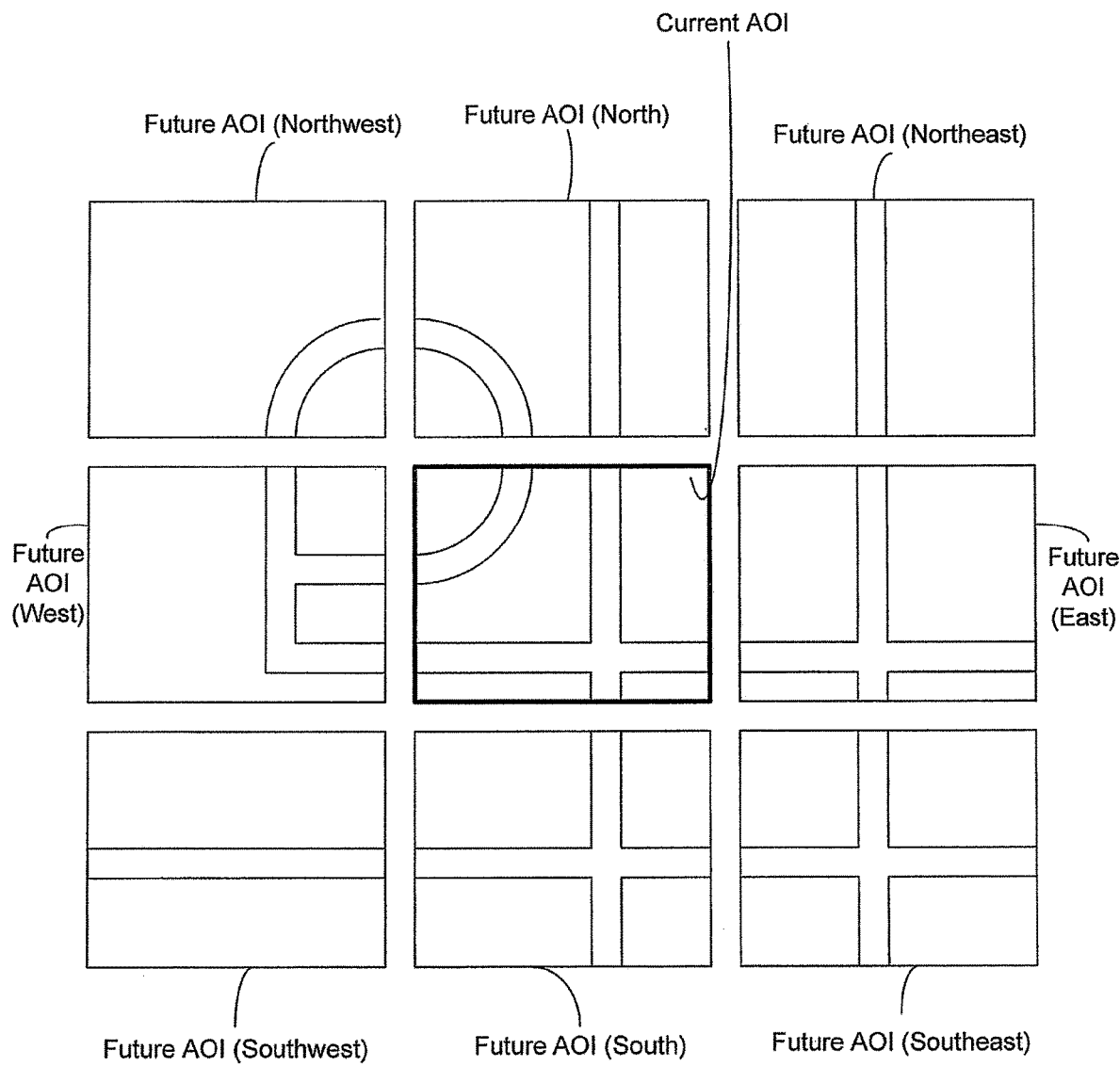
FIG. 6 is a schematic depiction of a map of a current AOI surrounded by maps of future areas of interest in accordance with one simplified implementation of the present technology.
Figure 7:
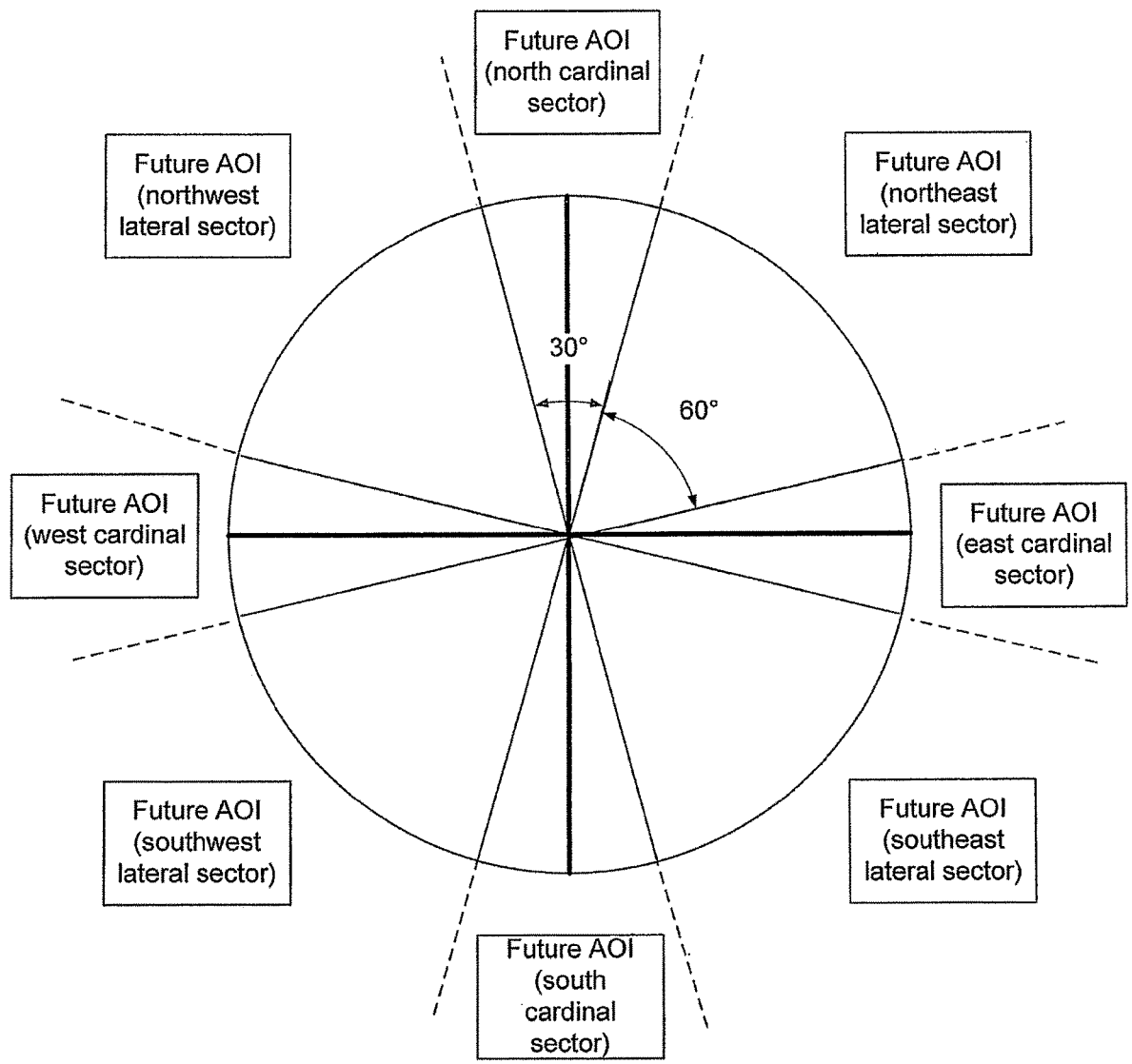
FIG. 7 is a schematic depiction of a sector-based system for determining which future AOI to select based on a bearing reading for the device.
Figure 8:
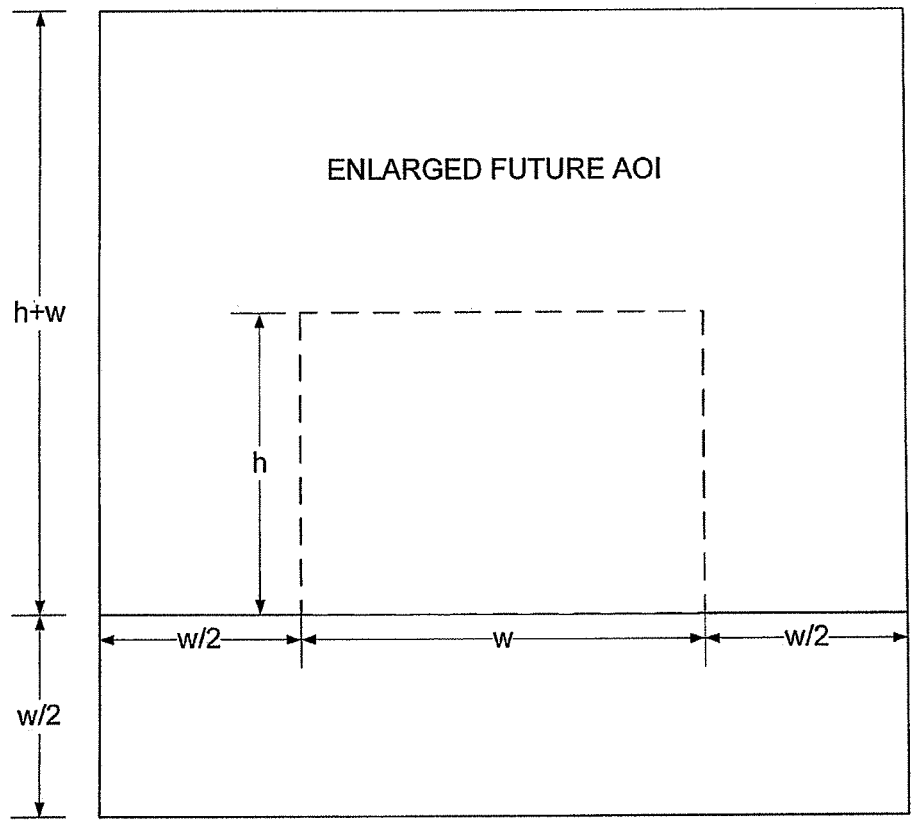
FIG. 8 is a schematic depiction of an enlarged future AOI that can be used in accordance with implementations of the present invention.
Figure 8:
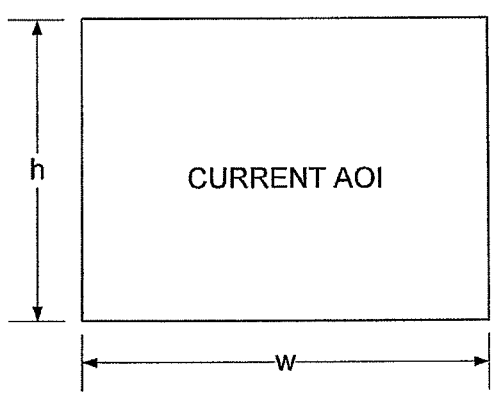

Implementations of the present technology will now be further described with regard to various specific examples presented in FIGS. 6-8.

Once the direction of travel (or bearing) is determined, the device determines a future area of interest for map data is to be downloaded. As shown in FIG. 6, the central rectangular portion represents the current AOI. Based on the direction of travel in this approach, the device picks one (or more) of the eight adjacent areas as the future area of interest. In this example, there are only eight possible areas of interest: AOI Northwest, AOI North, AOI Northeast, AOI East, AOI Southeast, AOI South, AOI Southwest, and AOI West. In this simplified example, the device picks one of these AOI's as the likely or anticipated future area and downloads the map data for storage in its cache.

FIG. 7 depicts a sector-based technique for determining an area of interest based on a bearing heading or direction of travel. In this example presented in FIG. 7, four cardinal sectors (north, south, east and west) are defined to subtend an angle of 30 degrees. Four lateral sectors (interspersed between the cardinal sectors) are then defined (each subtending 60 degrees), namely a northeast sector, a southeast sector, a southwest sector, and a northwest sector. Thus, the device can determine an instantaneous or average bearing and then correlate that bearing to one of the sectors. The device can use a running average of the bearing readings over a prescribed period of time to arrive at an average bearing. For example, if the device is on a course of 045 degrees, then the map data for the northeast lateral sector will be downloaded. For example, if the device is on a course of 185 degrees, then the map data of the AOI associated with the south cardinal sector will be downloaded. In one implementation, when the device heads in a lateral direction (i.e. towards a lateral sector), the device also downloads and caches the adjacent cardinals. For example, if the device heads northeast, then the device will download and cache not only the map data for the AOI corresponding with the northeast lateral sector but also for the AOI corresponding with the north and east cardinal sectors. As noted above, optionally more than one future AOI may be downloaded in parallel. Alternatively, map data for a future AOI may be flushed from the cache if it becomes apparent that the prediction is wrong, i.e. if the device changes course, although the device may also be configured to store data for more than one future AOI. In an alternative implementation, rather than having four 60-degree lateral sectors, there could be eight 30-degree lateral sectors. In yet another alternative implementation, there could be sixteen sectors of 22.5 degrees with twelve lateral sectors for north-northeast, northeast, east-northeast, etc.

In one implementation, the future AOI is defined as being larger than the current AOI, as depicted schematically in FIG. 8. In this specific example, the enlarged future AOI has a band on either side equal to w/2 where w represents the width of the current AOI. As will be appreciated, the various areas (future AOI areas) may be adjacent and discrete (i.e. non-overlapping) or partially overlapping.

Figure 9:
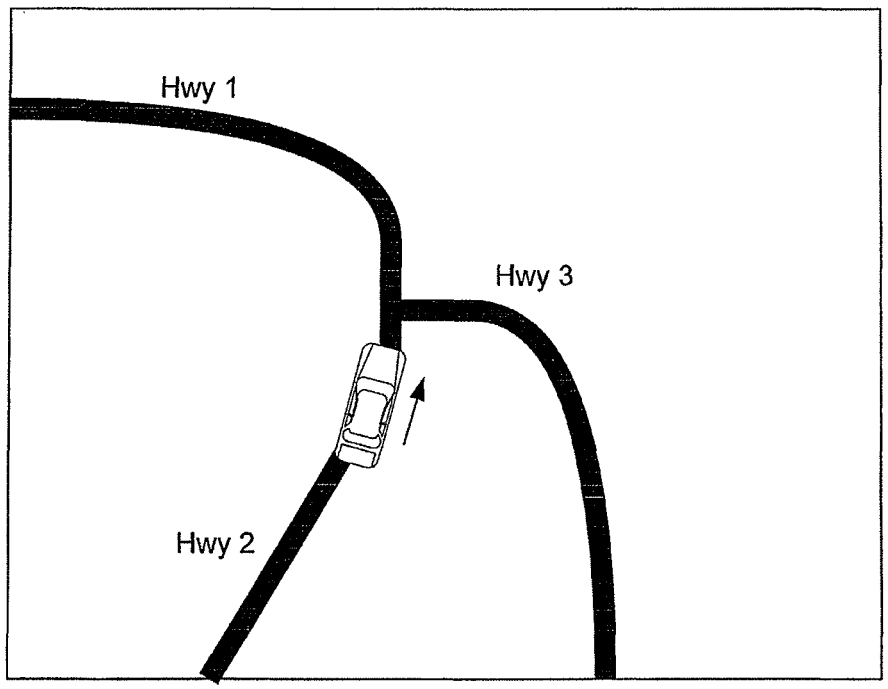
FIG. 9 is a schematic depiction of a map generated by a navigation application showing a vehicle icon (representing in this case the user device) approaching a fork in the road.
Figure 10:
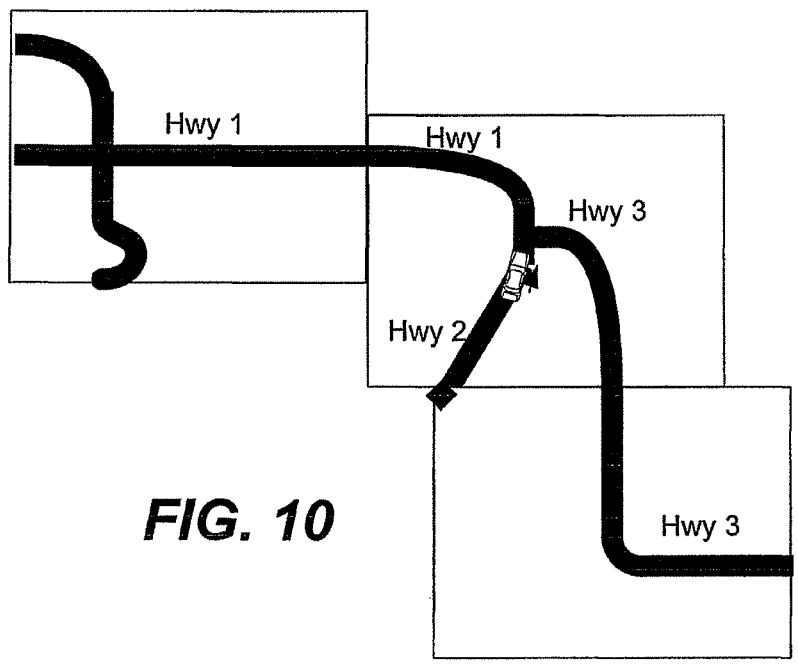
FIG. 10 schematically depicts two possible future AOI's (one if the device heads down Highway 1 and the other if the device heads down Highway 3)

FIG. 9 illustrates how the device can predict future areas of interest based not only on the direction of travel (bearing) but also by identifying the path or roadway upon which the user of the device is traveling. In the case where the device is following a defined route, such as for example, where the device is travelling in a car on a roadway, then discrete paths can be assumed, i.e. assuming no off-roading. Where the device is confined to a network of defined roadways, route prediction becomes much simpler, particularly in rural areas where the road density is lesser. In this particular example, the device can assume that the user will either follow Highway 1 or Highway 3. The device predicts that it might need to get the future AOI immediately adjacent and to the west of the current AOI where Highway 1 extends westward, as shown in FIG. 10. The device also predicts that it might need the map data of the southerly AOI (also shown in FIG. 10) in the event that the user follows Highway 3 southbound. This means that the device may attempt to download map data for both of these areas, or alternatively may simply choose one or the other based on historical usage. Where there is more than one potential future AOI, the device may download their respective map data together (in parallel) are sequentially (serially). Once the device has reached the fork in the road and it is clear that the user has taken one direction rather than the other, the device may flush whatever map data has been downloaded for the other route.

Determining whether the user carrying the device is riding in a vehicle (and is thus presumably confined to roadways) or is simply walking around on foot, and thus generally unconstrained can be done by detecting the velocity of the device. If the velocity exceeds a certain threshold, then the device can be presumed to be inside a vehicle. Velocity detection can be accomplished using a GPS chip, for example. Alternatively, the user may switch the device between vehicle and pedestrian settings. Alternatively, the device may know that GPS location itself may be sufficient to indicate whether the device is located on a roadway or not. Thus, one significant aspect of this technology is that the processor and memory cooperate to determine whether the device is being operated in a vehicle that is confined to a particular route (roadway, bike path, canal, etc.) This determination can be made by comparing a GPS position fix with coordinates for various types of routes or pathways and/or by measuring the velocity of the device. By determining whether the device is being carried by a pedestrian, by a person in a car, train, boat or aircraft will enable the device to better predict which map data it will likely require based on the confines of the route over which the user and his device are traveling.

Figure 11:
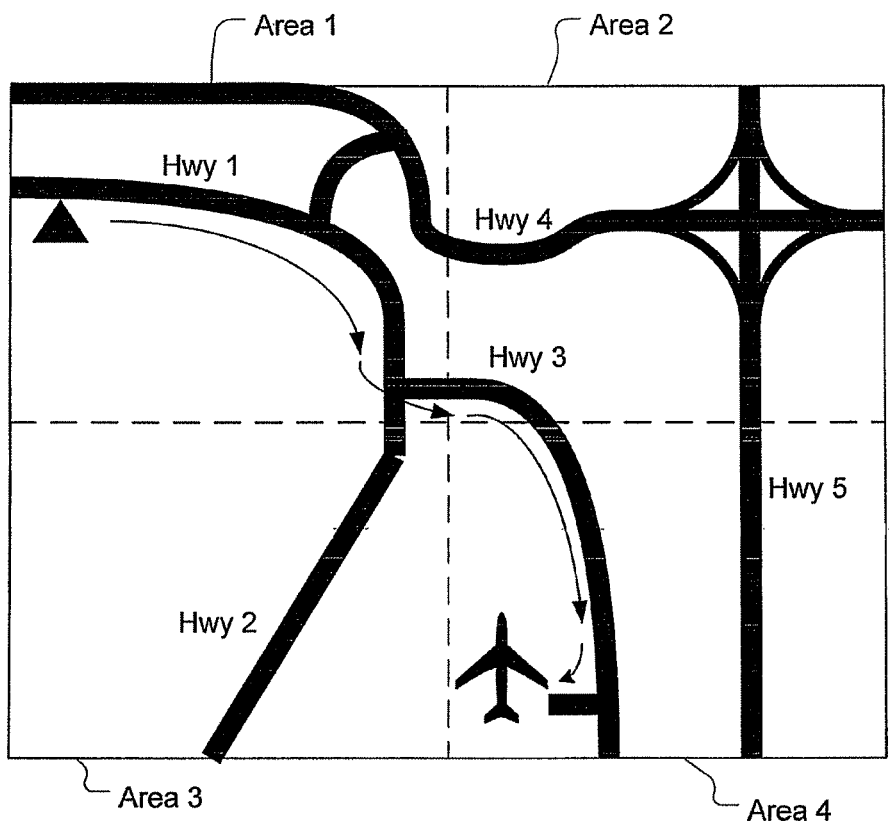
FIG. 11 schematically depicts how future areas of interest are predicted for a route programmed in a navigation application.

In another implementation, the device can anticipate or predict which map data to download by identifying a programmed route in a navigation application. If the user has programmed route from a starting point to a destination, then that route will serve as a basis for determining which map data will be required before the user (and the device) actually reaches any of the points along the route. FIG. 11 presents, by way of example, a programmed route from the triangular icon (representing the starting point) to the airport. In this case, the current AOI at the outset of the trip is Area 1. The device then identifies that the programmed route takes the device through Area 2 and into Area 4. Accordingly, Area 2 and Area 4 are future AOI's whose map data will be required. This map data can be downloaded in advance and cached on the device so that upon transitioning from one area to the other, the device can render the map data without having to download it.

Figure 12:
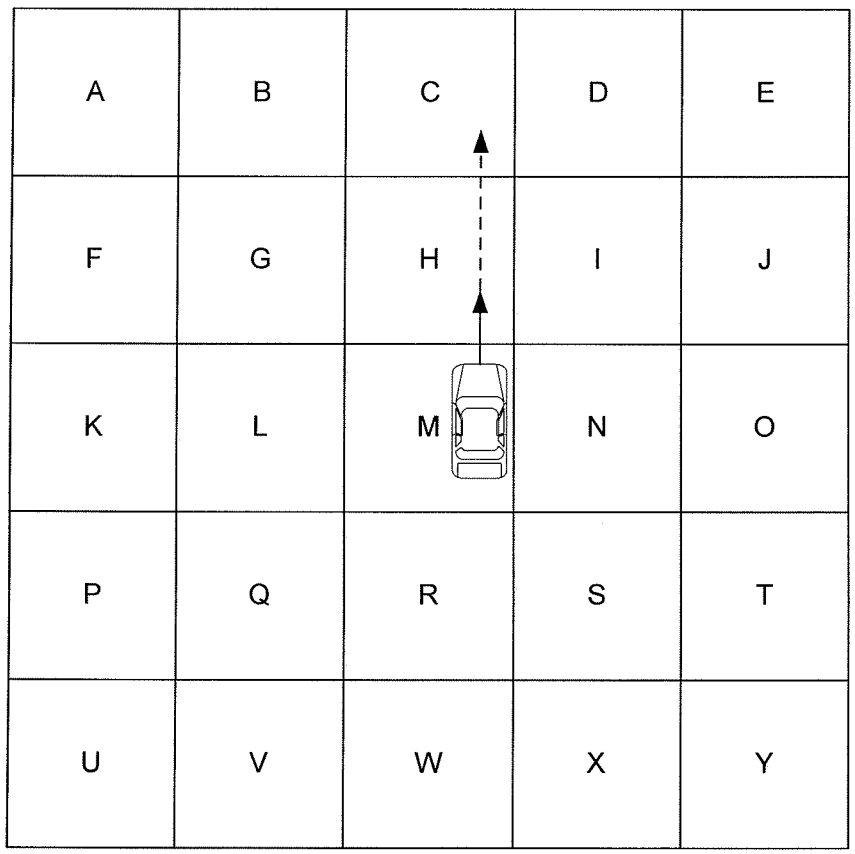
FIG. 12 schematically depicts a technique for efficiently downloading map data by prioritizing map tiles based on a direction of travel to ensure that the map tiles lying in the direction of the travel are downloaded preferentially.
Figure 12:
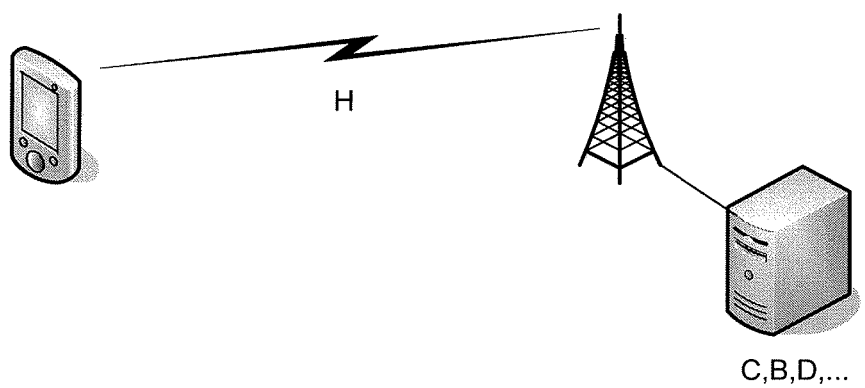

FIG. 12 schematically depicts a technique for efficiently downloading map data by prioritizing map tiles (i.e. sectors of a map) based on a direction of travel to ensure that the map tiles lying in the direction of the travel are downloaded preferentially. Consider the example scenario presented in FIG. 12 in which 25 map tiles labelled as Tiles A through Y are located in the vicinity of the current location of the device. Assume the device is currently at Tile M. As the device moves, for example, north from Tile M to Tile H, the map display has to be re-centered. Former contents of Tile H shift to Tile M and all contents are re-centered. The contents of Tile C are important for the device traveling in the northerly direction so this tile (Tile C) is thus downloaded preferentially. For example, as depicted in this figure, while Tile H is being sent to the client device, the server prioritizes the other tiles based on direction of travel (e.g. C, B, D, etc.). Prioritizing map tiles based on the direction of travel can be done not only for vector map data but also for map data formatted as bitmaps.

Figure 13:
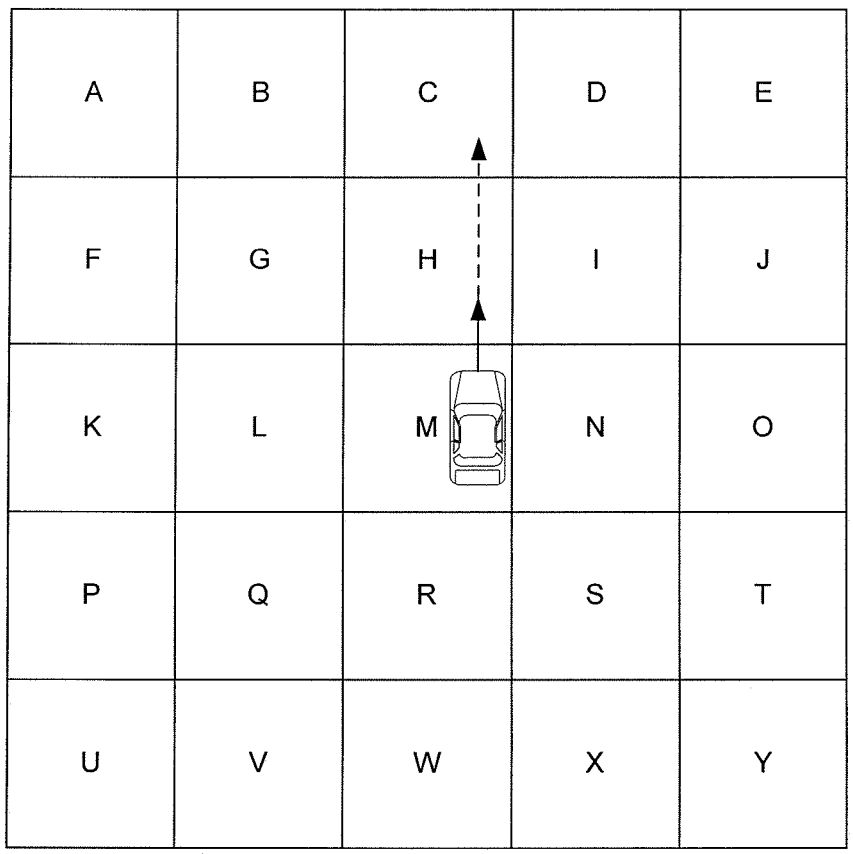
FIG. 13 schematically depicts a related technique for efficiently downloading map data by caching the map data for those map tiles lying ahead of a direction of travel to ensure that map tiles in the direction of travel are pre-loaded (or cached) on the device.
Figure 13:
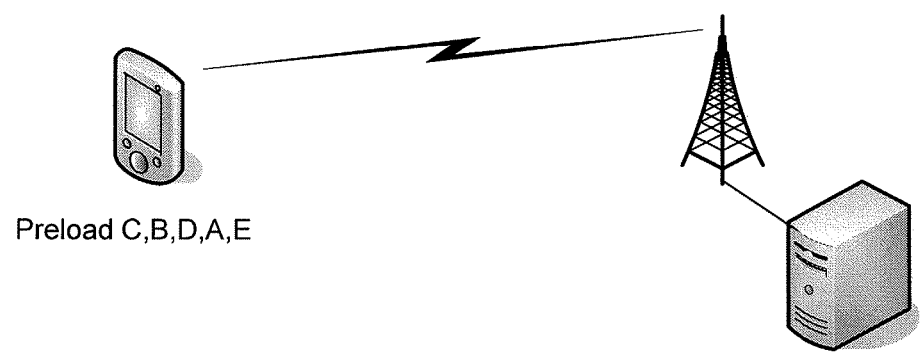

FIG. 13 schematically depicts a related technique for efficiently downloading map data by caching the map data for those map tiles lying ahead of a direction of travel to ensure that map tiles in the direction of travel are pre-loaded (or cached) on the device. Again consider the scenario where the device is moving north from Tile M to Tile H. As the map is re-centered, map tiles A through E are pre-loaded and cached on the device in case the device continues to move north (which is the likely direction at this point). For example, as depicted in this figure, tiles A-E are preloaded (and cached locally) as the device moves from M to H. In a variant, the device could look not only at the direction of travel but also at the rate of change of direction of travel in order to predict where the device is headed. In another variant, the device could look at roadways, rail lines, shipping channels, pathways or other confined routes that may indicate where the device is headed. A road heading north may veer to the west, thus indicating where the device is probably going. In yet another variant, the device could learn routes based on travel patterns. By learning routes and monitoring travel patterns, the device can intelligently predict what map tiles are required ahead of time. For example, the user may take his device back and forth to work Monday through Friday, to the arena every Saturday morning and to church every Sunday morning. These habitual routes can thus be learned by the device by simply monitoring the travel patterns of the user over a period of time. If the routes are repeated more with a certain regularity, then the device learns that these are "patterns" of behaviour that are likely to be repeated in the future. Thus, when Monday morning comes around, the device predicts that the user will travel to work and can pre-load the map tiles along the route to work. When Saturday comes along, the device pre-loads the map tiles for the route to the arena. This example demonstrates how routes can be learned by the device so that map tiles can be preloaded and cached on the device. Accordingly, the memory and processor of the wireless device cooperate to monitor and record displacements of the device, to discern travel patterns from the displacements of the device and to predict future areas of interest for pre-emptively downloading map data. Preloading map data can be done not only for vector map data but also for bitmap map data.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method, performed by a wireless communications device, of requesting map data, the method comprising:
   a) determining a current location of the wireless communications device using a GPS positioning subsystem of the wireless communications device;
   b) determining a current Area Of Interest (AOI);
   c) downloading first map tiles corresponding to the current AOI;
   d) displaying the first map tiles;
   e) predicting a future AOI, the predicting comprising identifying a programmed route in a navigation application executing on the wireless communications device, the future AOI being a geographical area adjacent to the current AOI;
   f) determining map tiles corresponding to the future AOI;
   g) downloading the map tiles corresponding to the future AOI;
   h) determining a new current location of the wireless communications device and determining whether the new current location is within the future AOI;
   i) in response to determining the new current location is not within the future AOI, determining whether the current direction of travel has changed, and when the current direction of travel has changed, repeating steps e) through h) to obtain map tiles corresponding to an updated future AOI; and
   j) in response to determining the new current location is within the future AOI, displaying the map tiles corresponding to the future AOI on the wireless communications device.

2. The method as claimed in claim 1 further comprising caching the map data for the future AOI.

3. The method as claimed in claim 1 wherein predicting the future AOI further comprises identifying a current roadway upon which a user of the wireless communications device is travelling.

4. The method as claimed in claim 1 wherein the current direction of travel is determined with reference to a plurality of sectors comprising four 30-degree cardinal sectors that are aligned with north, south, east and west directions and four 60-degree lateral sectors that are disposed between the cardinal sectors.

5. The method as claimed in claim 1 wherein downloading map data for the future AOI comprises defining an enlarged off-screen map area that is larger than the current AOI.

6. The method as claimed in claim 5 wherein a width of the enlarged off-screen map area is equal to twice a width of the current AOI.

7. A non-transitory computer readable medium comprising code which, when loaded into memory and executed on a processor of a wireless communications device, is adapted to perform acts of:

a) determining a current location of the wireless communications device using a GPS positioning subsystem of the wireless communications device;
b) determining a current Area Of Interest (AOI);
c) downloading first map tiles corresponding to the current AOI;
d) displaying the first map tiles;
e) predicting a future AOI, the predicting comprising identifying a programmed route in a navigation application executing on the wireless communications device, the future AOI being a geographical area adjacent to the current AOI;
f) determining map tiles corresponding to the future AOI;
g) downloading the map tiles corresponding to the future AOI;
h) determining a new current location of the wireless communications device and determining whether the new current location is within the future AOI;
i) in response to determining the new current location is not within the future AOI, determining whether the current direction of travel has changed, and when the current direction of travel has changed repeating steps e) through h) to obtain map tiles corresponding to an updated future AOI; and
j) in response to determining the new current location is within the future AOI, displaying the map tiles corresponding to the future AOI on the wireless communications device.

8. The non-transitory computer readable medium as claimed in claim 7 wherein the code is adapted to perform an act of caching the map data for the future AOI.

9. A wireless communications device comprising:
a GPS positioning subsystem;
a radiofrequency transceiver;
a display; and
a processor operatively coupled to memory to perform the steps of:
a) determining a current location of the wireless communications device using the GPS positioning subsystem;
b) determining a current Area Of Interest (AOI);
c) downloading first map tiles corresponding to the current AOI;
d) displaying the first map tiles;
e) predicting a future AOI, the predicting comprising identifying a programmed route in a navigation application executing on the wireless communications device, the future AOI being a geographical area adjacent to the current AOI;
f) determining map tiles corresponding to the future AOI;
g) downloading the map tiles corresponding to the future AOI;
h) determining a new current location of the wireless communications device and determining whether the new current location is within the future AOI;
i) in response to determining the new current location is not within the future AOI, determining whether the current direction of travel has changed, and when the current direction of travel has changed, repeating steps e) through h) to obtain map tiles corresponding to an updated future AOI; and
j) in response to determining the new current location is within the future AOI, displaying the map tiles corresponding to the future AOI on the display.

10. The wireless communication device as claimed in claim 9 wherein the processor causes the map tiles to be cached in the memory of the wireless communication device.

11. The wireless communications device as claimed in claim 9 wherein the processor predicts the future AOI by identifying a current roadway upon which a user of the wireless communications device is travelling.

12. The wireless communications device as claimed in claim 9 wherein the current direction of travel is determined with reference to a plurality of sectors comprising four 30-degree cardinal sectors that are aligned with north, south, east and west directions and four 60-degree lateral sectors that are disposed between the cardinal sectors.

13. The wireless communications device as claimed in claim 9 wherein the future AOI is an enlarged off-screen map area that is larger than the current AOI.

14. The wireless communications device as claimed in claim 13 wherein a width of the future AOI is equal to twice a width of the current AOI.

15. The wireless communications device as claimed in claim 9 wherein the memory and processor cooperate to monitor and record displacements of the device, to discern travel patterns from the displacements of the device and to predict future AOIs for pre-emptively downloading map data.

* * * * *